(12) United States Patent
Chevallier et al.

(10) Patent No.: US 8,380,522 B2
(45) Date of Patent: Feb. 19, 2013

(54) LAYER 2 COMPRESSION/DECOMPRESSION FOR MIXED SYNCHRONOUS/ASYNCHRONOUS TRANSMISSION OF DATA FRAMES WITHIN A COMMUNICATION NETWORK

(75) Inventors: Emmanuelle Chevallier, Orgeval (FR); Jean Farineau, Levallois Perret (FR); Jean-Noël Lignon, Frouzins (FR); Christophe Gerrier, Colombes (FR); Xavier Denis, Colomiers (FR); Christelle Aime, Boulogne Billancourt (FR)

(73) Assignee: Alcatel Lucent, Paris (FR)

( * ) Notice: Subject to any disclaimer, the term of this patent is extended or adjusted under 35 U.S.C. 154(b) by 1996 days.

(21) Appl. No.: 11/010,438

(22) Filed: Dec. 14, 2004

(65) Prior Publication Data

US 2005/0187777 A1    Aug. 25, 2005

(30) Foreign Application Priority Data

Dec. 15, 2003    (FR) ...................................... 03 14755

(51) Int. Cl.
*G10L 19/00* (2006.01)
*G10L 11/06* (2006.01)
*H04M 11/00* (2006.01)
*H04J 3/16* (2006.01)
*H04J 3/22* (2006.01)
*H04J 3/24* (2006.01)
*H04L 12/28* (2006.01)
*H04L 12/56* (2006.01)
*H04B 7/216* (2006.01)

(52) U.S. Cl. ........ 704/500; 704/210; 455/403; 370/401; 370/468; 370/335; 370/392; 370/395.1

(58) Field of Classification Search .................. 704/275; 370/352, 503, 310, 465–473, 592, 521
See application file for complete search history.

(56) References Cited

U.S. PATENT DOCUMENTS

| | | | | |
|---|---|---|---|---|
| 5,375,119 | A * | 12/1994 | Koivu | ........................... 370/401 |
| 5,493,610 | A * | 2/1996 | Suzuki et al. | ............ 379/100.17 |
| 5,873,058 | A * | 2/1999 | Yajima et al. | ................. 704/201 |
| 5,892,802 | A * | 4/1999 | Jung et al. | ..................... 375/354 |
| 5,892,811 | A * | 4/1999 | Armbruster et al. | .............. 379/7 |

(Continued)

FOREIGN PATENT DOCUMENTS

| | | |
|---|---|---|
| WO | 99/05871 A | 2/1999 |
| WO | WO 99/26358 A | 5/1999 |

(Continued)

*Primary Examiner* — Pierre-Louis Desir
*Assistant Examiner* — Matthew Baker
(74) *Attorney, Agent, or Firm* — Sughrue Mion, PLLC

(57) ABSTRACT

A device is disclosed for compressing data contained in input frames to be compressed constituted of stream frames defining portions of TRAU and signaling frames that have to be transmitted within a communication network and each of which is constituted of at least a header containing control data representative at least of the type of stream frame and where applicable payload data, certain types containing critical and/or non-critical data. The device analyzes each TRAU or signaling frame header contained in successively received input frames in order to determine its type and generates periodically compressed frames to be transmitted that are divided into first and second sections of variable size. The first section contains critical data compressed synchronously and the second section contains non-critical data compressed asynchronously.

18 Claims, 2 Drawing Sheets

U.S. PATENT DOCUMENTS

| | | | |
|---|---|---|---|
| 5,920,553 A * | 7/1999 | Keskitalo et al. | 370/335 |
| 6,032,197 A * | 2/2000 | Birdwell et al. | 709/247 |
| 6,067,289 A * | 5/2000 | Mueller et al. | 370/310 |
| 6,125,120 A | 9/2000 | Lehtimaki | 370/435 |
| H1880 H * | 10/2000 | Vines et al. | 370/310 |
| 6,324,188 B1 * | 11/2001 | Tsuji | 370/537 |
| 6,356,750 B1 * | 3/2002 | Heikkila | 455/403 |
| 6,377,541 B1 * | 4/2002 | Boetzel | 370/216 |
| 6,466,586 B1 * | 10/2002 | Darveau et al. | 370/468 |
| 6,570,891 B1 * | 5/2003 | Arimilli | 370/536 |
| 6,611,537 B1 * | 8/2003 | Edens et al. | 370/503 |
| 6,697,364 B1 * | 2/2004 | Kekki et al. | 370/389 |
| 6,721,304 B1 * | 4/2004 | Rasanen | 370/347 |
| 6,738,374 B1 * | 5/2004 | Olkkonen et al. | 370/389 |
| 6,832,195 B2 * | 12/2004 | Johnson | 704/270 |
| 6,876,666 B1 * | 4/2005 | Engdahl | 370/466 |
| 6,879,599 B1 * | 4/2005 | Galyas et al. | 370/466 |
| 6,985,866 B2 * | 1/2006 | Nakagaki | 704/500 |
| 7,035,215 B1 * | 4/2006 | Engdahl | 370/235 |
| 7,050,439 B1 * | 5/2006 | Kaaresoja | 370/395.1 |
| 7,072,296 B2 * | 7/2006 | Turner et al. | 370/230.1 |
| 7,072,336 B2 * | 7/2006 | Barany et al. | 370/389 |
| 7,092,875 B2 * | 8/2006 | Tsuchinaga et al. | 704/210 |
| 7,136,395 B2 * | 11/2006 | Lupien et al. | 370/472 |
| 7,142,881 B2 * | 11/2006 | Sekino et al. | 455/550.1 |
| 7,272,556 B1 | 9/2007 | Aguilar et al. | 704/230 |
| 7,301,947 B2 * | 11/2007 | Tourunen et al. | 370/392 |
| 7,457,315 B1 * | 11/2008 | Smith | 370/473 |
| 7,961,675 B2 * | 6/2011 | Riddington et al. | 370/329 |
| 2002/0016161 A1 * | 2/2002 | Dellien et al. | 455/403 |
| 2003/0050775 A1 * | 3/2003 | Zinser et al. | 704/219 |
| 2004/0062274 A1 * | 4/2004 | Hakansson et al. | 370/468 |
| 2005/0152341 A1 * | 7/2005 | Curcio et al. | 370/352 |
| 2005/0187777 A1 * | 8/2005 | Chevallier et al. | 704/500 |
| 2007/0150264 A1 * | 6/2007 | Tackin et al. | 704/207 |
| 2007/0248075 A1 * | 10/2007 | Liu et al. | 370/349 |

FOREIGN PATENT DOCUMENTS

| | | |
|---|---|---|
| WO | WO 01/58184 A | 8/2001 |

\* cited by examiner

LAYER 2 COMPRESSION/DECOMPRESSION FOR MIXED SYNCHRONOUS/ASYNCHRONOUS TRANSMISSION OF DATA FRAMES WITHIN A COMMUNICATION NETWORK

CROSS-REFERENCE TO RELATED APPLICATIONS

This application is based on French Patent Application No. 03 14 755 filed Dec. 15, 2003, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of transmitting data frames within communication networks, more particularly transmission involving compression/decompression.

2. Description of the Prior Art

To increase their connection capacities, some communication networks comprise compressors/decompressors for compressing data contained in frames to be transmitted.

In such networks, compression/decompression is referred to as "layer 1 compression/decompression" because it is applied to the physical layer of all frames to be compressed, regardless of their type. Layer 1 compression consists in detecting redundancies between the data contained in identical portions comprising stream frames of frames to be transmitted (known as input frames) in order to eliminate them but to report them so that they may be reconstituted on decompression. Stream frames compressed in this way are stored temporarily in buffer queues and routed to their destination as a function of available transmission capacity.

An input frame is a frame that feeds the compressor. It is made up of a multiplicity of stream frames constituting initial frame portions associated with different transmission channels. For example, in TDMA transmission mode, each input frame comprises a fixed number of time slots each comprising one byte. According to the ITU-T G.703/G.704 recommendations, this fixed number is equal to 32 in the case of E1 type frames and to 24 in the case of T1 type frames. The frame frequency is generally 8 kHz, enabling an E1 frame to convey 31 usable channels at 64 kbps (kbits/s), with one channel per time slot.

In a cellular network, an A-bis interface couples a base station controller (BSC) and one or more base transceiver stations (BTS) using E1 or T1 type frames. The A-bis interface conveys two types of stream: traffic streams (speech or data) and signaling streams. To convey traffic streams, each byte of the E1 or T1 frame is divided either into four "nibbles" each carrying one 16 kbps traffic channel (this is known as the "full rate" (FR) mode) or into eight "half rate" (HR) traffic channels, in which each bit corresponds to a voice channel. The signaling streams are generally carried by 2-bit (16 kbps) channels of 8-bit (64 kbps) channels. An initial E1 or T1 frame therefore constitutes a set of transmission channels with a size running from 1 bit for 8 kbps channels to 8 bits for 64 kbps channels; each channel conveys stream frames specific to each transmission channel.

Traffic streams are conveyed by transcoder/rate adapter unit (TRAU) frames exchanged between each BTS and the mobile switching center of the public land mobile network (PLMN), via a transcoder/rate adapter unit (TRAU), which in particular converts 13 kbps compressed speech data into 64 kbps digitized speech data to make the speech channels compatible with the mobile switching center. The mobile switching center and the TRAU are coupled via an A interface and the BSC and the TRAU are coupled via an A-ter interface.

Hereinafter, the expression "active channel" means any traffic channel that has been set up, i.e. in respect of which a call setup procedure has been executed correctly using a signaling channel, this procedure leading to the provision of a traffic channel that is dedicated to the call concerned and is maintained until the end of the calling phase. A traffic channel is used to convey TRAU frames exchanged between a calling party and a called party throughout the duration of the call, including during phases of silence.

The TRAU frames are of four types: speech (or data transfer) frames, which contain at least control data and payload data, silence frames, which contain at least control data, silence descriptor (SID) frames, which contain at least control data and payload data, and bad frames, which contain at least control data.

Hereinafter, the use of TRAU frames to transfer data will be lumped together with the use of TRAU frames to transport speech, exactly the same processing being applied in both cases.

When the decompressor receives compressed stream frames, it decompresses them successively to recompose (or restore) the original frames of which they constitute portions. This compression/decompression transmission mode may be described as asynchronous because it introduces "end-to-end" transmission delays for the recomposed original frames (or streams) which vary as a function of the load on the network. Moreover, these delays may vary considerably from one transmission channel to another. Also, the maximum transmission delay, which may be considered as guaranteed by the network operator, is high because the processing carried out along the whole of the transmission path is non-deterministic.

The non-deterministic nature of the end-to-end delay, combined with the fact that appropriate margins must be allowed to guarantee a maximum transmission delay, make it virtually impossible to use the compression technique described hereinabove in a voice communication network such as a GSM network, for example.

Thus one object of the invention is to improve on the above situation, and in particular to guarantee an end-to-end delay over the transmission path, as well as achieving an optimum compromise between the compression gain and the end-to-end delay, and where possible achieving compatibility with operation using layer 1 compression/decompression.

SUMMARY OF THE INVENTION

To this end the invention proposes a device for compressing data contained in input frames to be compressed constituted of stream frames defining portions of TRAU and signaling frames that have to be transmitted within a communication network and each of which is constituted of at least a header containing control data representative at least of the type of stream frame and where applicable payload data, certain types containing critical and/or non-critical data, which device is characterized in that it comprises analysis means adapted to analyze each TRAU or signaling frame header contained in successively received input frames in order to determine its type and compression means adapted to generate periodically compressed frames to be transmitted that are divided into first and second sections of variable size, the first section containing critical data compressed synchronously and the second section containing non-critical data compressed asynchronously.

In a "fixed" mode of operation, the sizes of the first and second sections are variable and complementary.

The compression device of the invention may have additional features, and in particular the following features, either separately or in combination:

- the frame types may be selected from the group comprising speech frames containing at least control data and critical payload data, silence frames containing at least critical control data, SID frames containing at least critical control data and non-critical payload data, and bad frames containing at least critical control data,
- the compression means may be adapted to generate a compressed frame every N input frames received during a compression cycle; they then aggregate N input frames into a single compressed frame during a compression cycle,
- the compression means may be adapted to integrate the speech frames into the compressed frames without modifying them,
- alternatively, if the speech frames contain synchronization data and control data, the compression means may be adapted to integrate the speech frames into the first sections of the compressed frames after suppression of the synchronization data but without modification of the control data and the payload data,
- the compression means may be adapted, once in possession of all of the control data of an SID frame or a silence frame or a bad frame, to eliminate therefrom redundant or non-significant information in order to generate a smaller relevant information word, for example of two bytes,
- the compression means may adapted to constitute compressed frames comprising a first section containing at least one relevant information word and/or a speech frame, without modification (or with elimination of the synchronization data), and a header identifying the start of the compressed frame and information designating each channel of the received input frame to which belongs the data from which the relevant information or the data of the speech frame is obtained,
- the compression means may be adapted to extract the payload data contained in the SID frames, in order to store it temporarily in a buffer, and in the received signaling frames, as a function of their order of arrival, thereby constituting a "string", and then to extract from the head of the string a portion whose size is selected as a function of the current variable size of the second section so as to integrate the portion into the second section of the frame currently being compressed, accompanied by a header identifying the start of the extracted portion and information designating each channel of the received input frame to which the payload data or the signaling data of the extracted string portion belongs, and finally to concatenate the second section with the first section to define a compressed frame to be transmitted,
- the compression means may be adapted to adapt the respective sizes of the first and second sections as a function of the load of the network in terms of speech and data transfer frames.

The invention also proposes a device for decompressing data contained in frames compressed by means of the above compression device, the decompression device comprising detection means adapted to analyze successively received compressed frames in order to separate their first and second sections, first processing means adapted to reconstitute synchronously the critical data of synchronously compressed input frames from the first received sections, second processing means adapted to reconstitute asynchronously the non-critical data of the asynchronously compressed input frames from the second received sections, and restoration means adapted to reconstruct the original input frames from reconstituted critical and non-critical data.

The synchronous processing means and the asynchronous processing means preferably operate in parallel.

The invention further proposes a compressor/decompressor comprising a compression device and a decompression device of the above type.

The invention finds a particularly beneficial, although non-exclusive, application in all point-to-point, point-to-multipoint and multipoint-to-multipoint communication networks such as satellite communication networks, terrestrial communication networks, such as E1 or T1 base networks or the like, for example, or Ethernet, IP, Frame Relay and ATM based networks, and terrestrial communication networks using satellite expansion for satellite or radio backup) over a portion of their connections, such as TDMA or CDMA cellular networks, for example.

Other features and advantages of the invention will become apparent on reading the following detailed description and examining the appended drawings.

DETAILED DESCRIPTION OF THE PREFERRED EMBODIMENT

The appended drawings constitute part of the description of the invention as well as, if necessary, contributing to the definition of the invention.

An object of the invention is to make provision for layer 2 compression/decompression of data frames within a communication network.

It is considered hereinafter, although this is not limiting on the invention, that the communication network is a cellular telephone network, for example of the GSM (2G) or GSM/GPRS (2.5G) type, for example, with satellite expansion (or satellite backup). The invention is not limited to this type of network, however. As previously indicated, it relates to all point-to-point, point-to-multipoint and multipoint-to-multipoint communication networks in which cable connections are defined with fixed or shared transmission resources or radio connections are defined with fixed or shared transmission resources, and in particular satellite communication networks, terrestrial communication networks, such as E1 or T1 based networks and the like, for example, or Ethernet, IP, Frame Relay and ATM based networks, and terrestrial radio communication networks using satellite expansion (or satellite or radio backup) over a portion of their connections, such as TDMA or CDMA cellular networks, for example.

Figure 1:
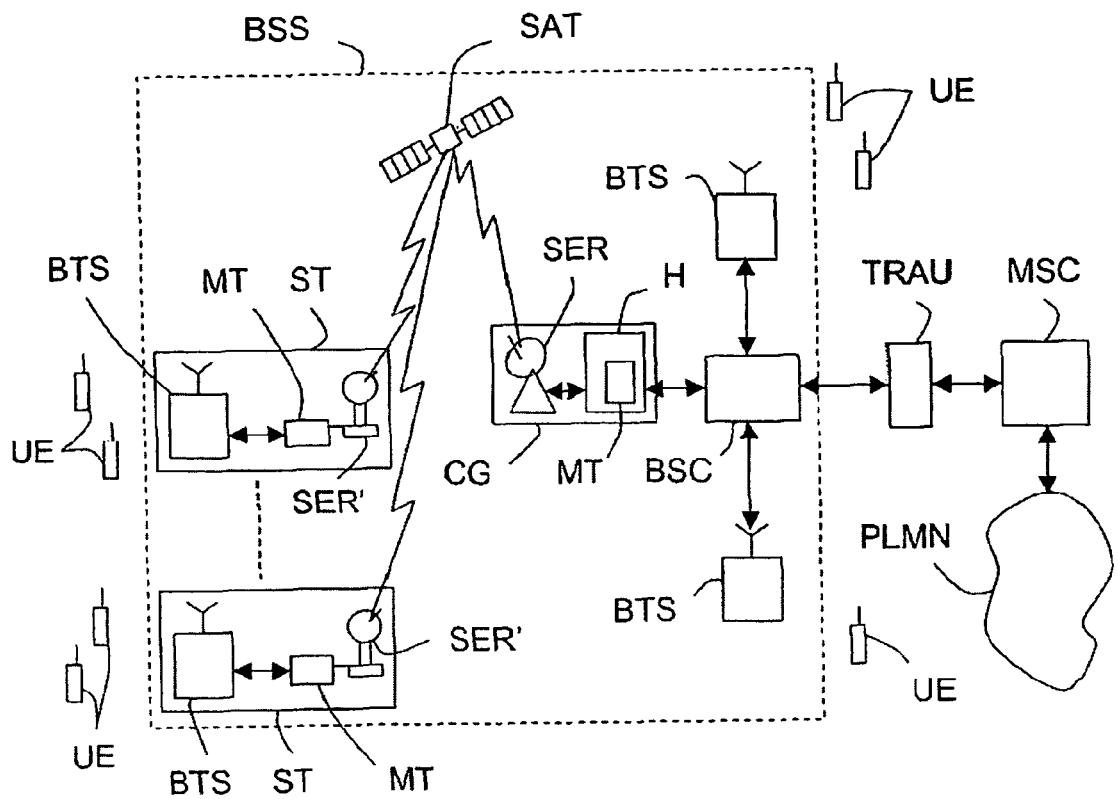
FIG. 1 shows diagrammatically part of a communication network of the invention with satellite expansion.

In outline, although in sufficient detail to allow an understanding of the invention, a GSM communication network with satellite expansion of the type shown in FIG. 1 may be considered as a standard radio subsystem, also known as a base station system (BSS), coupled to a core network, shown here in highly simplified form as a mobile switching center (MSC), which is in turn coupled to a public land mobile network (PLMN). The mobile switching center MSC is responsible for carrying out all the operations necessary for managing communication with user terminals UE.

In the conventional way, the BSS comprises at least one traffic management center CG taking the form of a hub H coupled to a transceiver station SER providing satellite links Li to a communication relay satellite SAT, for example. Alternatively, the hub H, which constitutes the exchange center for exchanges with remote traffic stations ST, may be separate from and/or remote from the management center CG.

The relay satellite SAT is coupled by satellite links to traffic stations ST of the BSS each comprising a base transceiver station (BTS) managing at least one radio cell in which user terminals UE set up mobile calls. Each base transceiver station BTS is coupled to a processing system MT responsible for processing frames to be transmitted and received frames and for assigning resources and itself coupled to a transceiver station SER' providing a satellite link Li with the satellite SAT.

The hub H is connected to the various traffic stations ST by satellite links that use a shared resource (carrier Lf) in a forward mode (i.e. from the hub H to the traffic stations ST) and a set of carriers (Lr) shared by all of the links in a return mode (i.e. from the traffic stations ST to the hub H).

The BSS also comprises at least one base station controller (BSC) coupled to the traffic management center CG, to be more precise to its hub H, and to the mobile switching center MSC. The BSC is primarily responsible for managing the resources of the various base transceiver stations BTS that are attached to it and for managing the operation and maintenance functions of said base transceiver stations.

The sharing of transmission resources is controlled by the traffic management center CG. To be more precise, the traffic management center CG dynamically assigns satellite resources in the form of transmission frequencies (in an SCPC operating mode) or time slots of a time frame (in a TDMA (time-division multiplexing) operating mode) as a function of the respective requirements of the various traffic stations ST that it manages. In other words, the traffic management center CG distributes the resources (or transmission channels) of the satellite SAT between the various satellite links that it manages.

It is considered hereinafter that the network is of the TDMA type, although this is not limiting on the invention.

Figure 3:
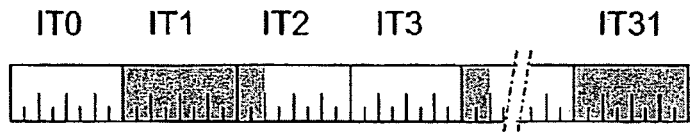
FIG. 3 shows diagrammatically one example of an E1 input frame.

As indicated above, the coupling between the BSC and the base transceiver stations BTS is effected via the synchronous A-bis interface, which uses G.704 type frames (E1 frames, of the type shown in FIG. 3). As shown in FIG. 1, the BSC may equally be coupled directly to base transceiver stations BTS independent of the satellite links via terrestrial A-bis backups.

Here the coupling between the BSC and the mobile switching center MSC is effected via a transcoder/rate adapter unit (TRAU) which converts 13 kbps compressed speech data into 64 kbps digitized speech data to make the speech channels compatible with the mobile switching center MSC. In GSM/GPRS networks, the transmission of data and signaling at the A interface between the MSC and the TRAU is effected on 64 kbps channels.

As indicated above, the mobile switching center MSC and the TRAU are coupled via an interface A and the BSC and the TRAU are coupled via an A-ter interface. To ensure a large territorial coverage, the mobile switching center MSC may be coupled to a plurality of BSC via a plurality of A-ter interfaces.

Figure 2:
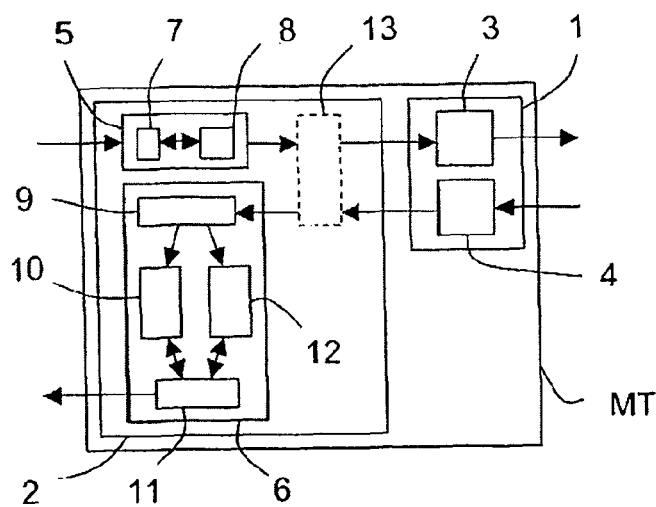
FIG. 2 shows diagrammatically a frame processing system comprising one embodiment of a compressor/decompressor of the invention.

As shown in FIG. 2, like each base station ST, the hub H comprises a frame processing system MT comprising a modem 1 coupled to a compressor-decompressor 2.

The modem 1 comprises a modulator 3 producing a modulated carrier for modulating frames compressed by the compressor/decompressor 2 and coming originally from the BSC or a BTS and a set of demodulators 4 each adapted to demodulate the carrier coming from a remote traffic station ST or from the BSC to restore the compressed frames at the compressor/decompressor 2 for it to decompress them before transmitting them to the BSC or the BTS.

Each compressor/decompressor 2 comprises a compression device 5 and a decompression (or expansion) device 6. In practice, the number of compressors/decompressors 2 in each frame processing system MT is the same as the number of satellite links Li. In fact, each compressor/decompressor 2 is fed with demodulated and compressed frames by a demodulator 4 and feeds a modulator 3 with compressed frames to be modulated.

It is considered hereinafter that each compression device 5 receives E1 input frames to be compressed from the BSC or from a BTS (however, they could equally be T1 frames, PDH frames or frames carried by SDH channels).

As shown in FIG. 3, and according to the ITU-T G.703/G.704 recommendations, an E1 frame is divided into 32 time slots IT0 to IT31 each comprising one byte.

Apart from time slot IT0, each time slot (IT1 to IT31) carries one or more transmission channels dedicated to a call (or link) or to transporting signaling. Each transmission channel carries a succession of "original frames", which are either TRAU frames for transporting speech and transferring data or signaling frames coming from a BTS or a BSC and to be transmitted to the network or to a user terminal UE.

There are four different types of TRAU frame:
speech (or data transfer) frames, which contain at least critical control data and critical payload data,
silence frames, which contain at least critical control data,
SID frames, which contain at least critical control data and non-critical payload data, and
bad frames, which contain at least critical control data.

Figure 4:
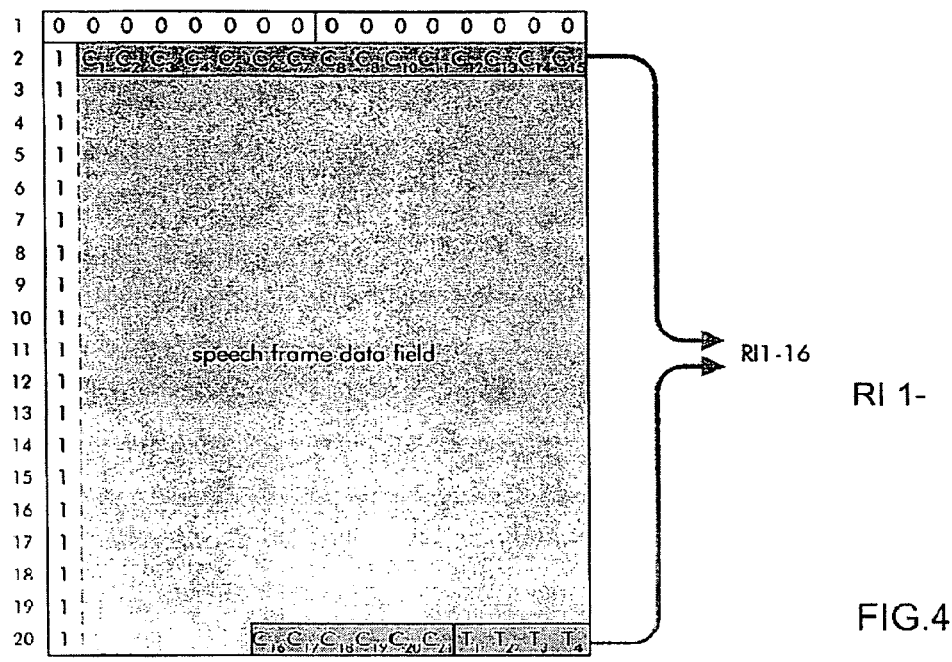
FIG. 4 shows diagrammatically one example of an original TRAU frame.

FIG. 4 shows one example of a TRAU speech frame. The synchronization data comprises the first 16 bits at zero (0), and 19 bits at one (1), one every subsequent sixteen bits. The control data comprises the bits $C_1$ to $C_{21}$ and $T_1$ to $T_4$. To be more precise, the bits $C_1$ to $C_{15}$ constitute the header of the TRAU frame, the bits $C_{16}$ to $C_{21}$ constitute a portion of the end part of the TRAU frame, and the (optional) bits $T_1$ to $T_4$ constitute another portion of the end part of the TRAU frame, used for time alignment. The set of control bits $C_1$ to $C_{21}$ characterizes the TRAU frame, and in particular its type (one of the four types referred to above). The speech frame data field is placed between the header and the end part. Here the speech data constitutes the payload data.

Thus a TRAU frame comprises either 320 (20×16) bits in the full rate (FR) situation and the enhanced full rate (EFR) situation, corresponding to a duration of 20 ms (milliseconds), or 160 (20×8) bits in the half rate (HR) situation.

In the case of a TRAU silence frame, the speech data field is invalid. In the case of a TRAU SID frame, the speech data field carries a comfort noise definition.

The TRAU bad frame is a special case and corresponds to an original frame received by a BTS with insufficient radio quality in terms of the signal/noise ratio. One of the control bits of a frame of this kind, called the bad frame indication (BFI) bit, reports this poor quality.

In the example of an E1 frame shown in FIG. 3, the shaded portions are for signaling frames and the unshaded portions are for speech. In this purely illustrative example, the time slot IT1 carries a 64 kbps signaling channel, the time slot IT2 carries a 16 kbps signaling channel and then three 16 kbps traffic channels (or six 8 kbps traffic channels, or even a combination of 16 kbps channels and 8 kbps channels), and the time slot IT3 carries only traffic channels.

A compression device 5 not only compresses frames to be transmitted but also adapts the format of the data blocks at the interface with the modem 1, which is of the E1, T1, Ethernet, IP or ATM type. Moreover, a decompression device 6 not only restores, by decompressing them, the original frames (i.e. the frames as they were before being compressed in the traffic station ST), but also provides the adaptation required at the interface with the modem 1, which is generally of the same type as that of the compression path.

As indicated above, some streams, such as those containing speech data, for example, are critical in terms of end-to-end transmission delay, and must therefore be processed differently to the other streams, to enable the operator to guarantee their transmission within the shortest possible fixed end-to-end delay.

The invention therefore proposes to apply synchronous deterministic processing to the critical streams throughout the transmission path (compression-transmission-decompression) and to apply asynchronous non-deterministic processing to the non-critical streams throughout the transmission path.

The disassociation between streams processed synchronously and asynchronously is established by configuration. To be more precise, it is the operator who specifies which channels must be processed synchronously (generally those carrying voice) and which channels must be processed asynchronously (generally those carrying signaling).

The compression device 5 is therefore configured to distinguish critical streams from non-critical streams and then to apply different (respectively synchronous and asynchronous) processing to them.

To this end it includes an analysis module 7 for analyzing the control bits of each TRAU frame received from the BTS or the BSC, in order to determine the type of frame received. This analysis module 7 operates at the compression cycle level. In the example described, the compression cycle applies to N=64 E1 frames, i.e. to a time period of 8 ms, each E1 frame having a duration of 125 μs (microseconds). The compression cycle defines the timing with which the compressed frames TC are transmitted from the compression device 5 to the decompression device 6 at the other end of the link. The compression cycle also defines the timing with which TRAU input frames are analyzed.

A TRAU original frame having a duration of 20 ms, three consecutive compression cycles are required to obtain all of the information that it conveys, including the control bits at the start and end of the frame. As a function of the value of these control bits, the TRAU frame is identified as a speech (or data transfer) frame, a silence frame, an SID frame or a bad frame. Thus the analysis module 7 is able to determine the type of compression that must be applied to the TRAU frame received during the three compression cycles concerned.

In the case of signaling channels, the analysis module 7 restricts itself to extracting the frames carried by the channel and storing them in a buffer dedicated to the channel concerned.

The compression device 5 also includes a compression module 8 for generating a compressed frame TC in each compression cycle using the data extracted by the analysis module 7.

To be more precise, as soon as the compression module 8 is advised by the analysis module 7 of the type of a TRAU frame, it transmits the significant data carried by the TRAU frame:

control data and critical payload data in the case of a frame recognized as a speech or data transfer frame,
control data in the case of a silence frame,
control data and non-critical payload data in the case of a frame recognized as an SID frame,
control data in the case of a bad frame.

In the case of signaling channels, the compression module 8 handles multiplexing the signaling streams with the traffic streams.

Figure 5:
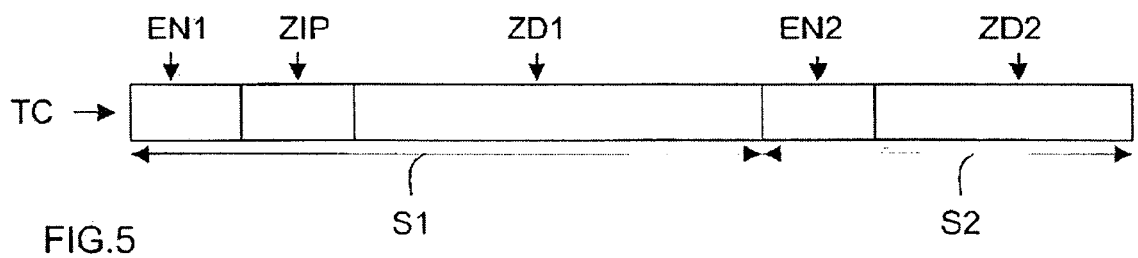
FIG. 5 shows diagrammatically one example of a frame compressed in accordance with the invention.

According to the invention, and as shown in FIG. 5, each compressed frame TC that was compressed by the compression module 8 comprises first and second sections S1, S2 of variable size. The first section S1 contains critical data compressed synchronously and the second section S2 contains non-critical data compressed asynchronously.

The critical data preferably comprises control data (or bits) ($C_1$ to $C_{21}$ and $T_1$ to $T_4$) and speech data, whereas the non-critical data preferably comprises comfort noise data (of SID frames) and signaling data (of signaling frames).

The compression may be effected in the manner indicated hereinafter.

The compression module 8 first constitutes the first sections S1 of the compressed frames TC, also referred to as synchronous frames. As shown in FIG. 5, these synchronous frames S1 comprise a header EN1 and a ZIP field and/or a ZD1 field.

The ZIP field is dedicated to what is known as relevant information contained in the control data $C_1$ to $C_{21}$ and $T_1$ to $T_4$ (i.e. 25 bits) of the SID frames, silence frames and bad frames. It preferably comprises a relevant information word (RI 1-16) consisting of two bytes (16 bits), for example, constituted by eliminating redundant or non-significant information contained in the 25 bits of the control data.

The ZD1 field is dedicated to speech data contained in the speech frames. It comprises all the data contained in the speech frame, namely synchronization data, control data and speech data, for example. However, it could instead contain a compressed version of the speech frame, that is to say only its control data and its speech data (in this case the 35 synchronization bits are eliminated).

The header field EN1 identifies the start of the synchronous frame and thus the start of the compressed frame. It also contains information that designates each channel of the received input frame to which belongs the data from which the relevant information of the two-byte word (ZIP) or the speech frame data (ZD1) is obtained. In fact, it comprises all the information needed by the decompression device 6 to reconstitute the critical data and thus the frames from which it is obtained.

As shown here, the ZIP field is preferably interleaved between the header EN1 and the ZD1 field.

Once the first section S1 has been constituted, the compression module 8 constitutes the second section S2 of the compressed frames TC, also referred to as asynchronous frames. As shown in FIG. 5, each asynchronous frame S2 comprises a header EN2 and a field ZD2.

The field ZD2 contains non-critical data, to be more precise signaling data and/or comfort noise payload data of SID frames. It may equally consist at least in part of stuffing data in the absence of non-critical data to be transmitted or if there is insufficient non-critical data to be transmitted.

Figure 6:
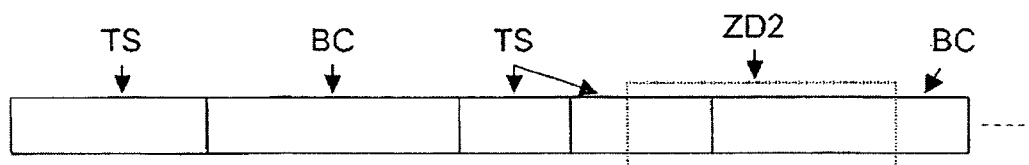
FIG. 6 shows diagrammatically one example of the chaining of non-critical payload data stored in a buffer memory pending insertion into a second section of a compressed frame of the type shown in FIG. 5.

In fact, this non-critical data is stored temporarily by the compression module 8, as and when it arrives, in buffer queues in which it constitutes strings of the type shown in FIG. 6.

This data is then extracted by the compression module 8 as a function of the order of arrival (the oldest data, i.e. that at the head of the string, being extracted first), but more importantly as a function of the available space in the second section S2 at the time of compression.

The respective sizes of the first section S1 and the second section S2 of a compressed frame TC preferably vary independently, with a fixed or changing overall value, as a function of the load of the network (in terms of the number of speech frames to be transmitted).

With fixed transmission resources, the greater the number of speech frames to be transmitted, for example at peak times, the larger the first section S1 and the smaller the second section S2. Conversely, the smaller the number of speech frames to be transmitted, for example in slack periods, the larger the second section S2 and the smaller the first section S1.

With changing transmission resources, as is the case with a transmission device operating in the DAMA mode, the two sections may evolve independently of each other, the transmission device adapting the resources assigned to the overall load consisting of the streams conveyed via the first section S1 and the second section S2.

The respective sizes of the first section S1 and the second section S2 are updated on each compression cycle, in particular as a function of the traffic load. Accordingly, the compression module 8 always knows the quantity of non-critical data that it may extract from a string stored in a buffer to feed the field ZD2 of the asynchronous frame S2.

If the amount of data stored at the head of a string and belonging to the same frame, for example the same signaling frame, is greater than that available (current) in the second section S2, only a portion of that data is integrated into the second section S2, the other portion awaiting its integration into the next compressed frame. It may equally be envisaged that the amount of data stored at the head of a string and belonging to the same frame be less than that available (current) in the second section S2. In this case, this data is integrated into the second section S2 by concatenation with a portion of (or the whole of) the data that follows it in the string and belongs to another frame.

The header field EN2 identifies the start of the asynchronous frame S2. It contains information that designates each channel of the received input frame to which belongs the data from which the data contained in the field ZD2 is obtained, as well as the length of said field ZD2. In fact, the header field EN2 contains all of the information needed by the decompression device 6 to reconstitute the non-critical data and thus the frames from which it is obtained.

Once the second section S2 has been constituted, the compression module 8 concatenates it with the first section S1, to constitute a compressed frame TC of the type shown in FIG. 5. The compression device 5 may then format it in the format of the data blocks at the interface with the modem 1 before transmitting it to the modulator 3 concerned.

The delay introduced by asynchronous compression therefore varies as a function of the capacity offered by the transmission link at a given time and the capacity used by the streams processed synchronously, whereas the delay introduced by synchronous compression is fixed.

Broadly speaking, the operation of the decompression device 6 of the invention is the opposite of that of the compression device 5 that has just been described.

To be more precise, the decompression device 6 firstly comprises a detection module 9 for analyzing compressed frames TC that it receives (successively) from the demodulator 4 to which it is coupled, in order to separate their first section S1 and second section S2. To this end it detects their respective headers EN1 and EN2.

The decompression device 6 further comprises a first processing module 10 for reconstituting synchronously, from the received first sections S1, the critical data that was originally contained in the input frames and that has been compressed synchronously.

To be more precise, the speech frames are reconstituted using payload data contained in the field ZD1 (where applicable after reinsertion of the synchronization data). They are then transmitted to a frame restoration module 11 of the decompression device 6 for returning them to their original location in the input frame E1, in the light of the information contained in the header EN1.

Silence frames are reconstituted using relevant information words contained in the field ZIP and restored by the frame restoration module 11 to their original location in the input frame E1, in the light of information contained in the header EN1 and the default value of the speech data field.

The reconstitution of the SID frames is somewhat more complex, since it requires reconstitution to be effected by a second processing module 12 of the decompression device 6 dedicated to compressed streams transmitted in asynchronous mode. The processing module 12 stores the contents of the frames received via the asynchronous transmission channel (second section S2 of the compressed frame TC), which contents relate to SID frames or signaling frames. For the contents relating to SID frames, the most recent content is substituted for the preceding content; this content constitutes the payload field D1-D260 of the SID frame, constituting comfort noise for the channel concerned. The second processing module 12 comprises at least as many buffers as there are traffic channels. In order to route the data D1-D260 received to the required traffic channel, the second processing module 12 uses the header information EN2 to determine the channel to which the received field D1-D260 belongs, and thus in which buffer this data must be stored.

In parallel with this process of storing data received asynchronously, the first processing module 10 reconstitutes the body of the SID frame from the relevant information words, received synchronously, using the same process that is used for silence frames. The body of the SID frame concerns the synchronization bits, control bits $C_1$ to $C_{21}$ and time alignment bits $T_1$ to $T_4$ part.

As for speech frames and silence frames, the frame restoration module 11 is responsible for restoring each SID frame to its original location in the output frame E1. The SID frame as restored by the frame restoration module 11 consists of the body of the SID frame reconstituted by the first processing module 10 and the payload field D1-D260 of the SID frame buffered by the second processing module 12.

For the first silence frame that follows a succession of speech frames, the second processing module 12 is able to sample the data characterizing the comfort noise throughout the last (SID) frame received, which was transmitted at the time of the transition from the speech mode to the silence mode, in the same mode as speech frames. This operation guarantees a more precise transition from the synchronous transmission mode, which applies to speech frames, to the asynchronous transmission mode, which applies to SID frames: the comfort noise present in the buffer of the channel concerned is more recent than that which would have been present without this operation, in this instance the noise sampled just before the sequence of speech frames. Thanks to this operation, the noise present in the buffer is the noise sampled immediately at the end of the speech sequence, even before asynchronous transmission of the data D1-D260 has been effected for the same channel.

It is important to note that the second processing module 12 is also responsible for reconstituting the signaling data contained in the field ZD2, which data is then transmitted to the frame restoration module 11 in order for it to restore it to its original location in the input frame E1, in the light of information contained in the header EN2.

The first processing module 10 and the second processing module 12 preferably operate in parallel.

In the context of radio or satellite backup, another object of the invention is to guarantee that the error rate guaranteed for each type of stream conforms to constraints specific to the stream concerned.

The person skilled in the art knows that some modems are adapted to encode information contained in frames to be transmitted. This encoding is fixed and independent of the types of stream transmitted. It limits the error rate on reception by inserting redundant data into the information transmitted. To guarantee the optimum spectral efficiency, i.e. to maximize the fixed satellite band usable bit rate, the rate of this encoding is set at a low value, so that the overhead introduced by the redundant data remains as low as possible, for a given error rate. The tolerable error rate on an A-bis backup with compression depends on the stream conveyed, for example:

an error rate that is generally less than $10^{-10}$ in the case of header information necessary for the decompression process, a low error rate, of the order of $10^{-8}$, in the case of speech frames, a low error rate in the case of signaling frames, a medium error rate in the case of data relating to comfort noise.

To optimize transmission as a function of the stream transmitted, the invention proposes pre-encoding to suit the error rate to each type of stream (or traffic).

To this end, the processing system MT comprises a pre-encoder module 13, preferably installed in its compressor/decompressor 2, for independently pre-encoding each type of stream, preferably with the exception of streams most tolerant of the error rate, for example streams relating to comfort noise.

This pre-encoding entails introducing redundant bits for each type of stream transmitted, except for streams necessitating the lowest transmission quality (comfort noise in the preceding example). The number of redundant bits depends on the required quality. The redundant bits are used at the receiver to detect and correct errors introduced on the link. The greater the number of redundant bits, the more the error rate may be reduced by this principle, for a given link quality (signal to noise ratio and intermodulation).

The expression "pre-encoding" alludes to the introduction of additional redundant bits over and above those introduced by the transmission device, which also carries out encoding, according to the same principle, with the aim of reducing the impact of link imperfections, but with no differentiation between the different types of stream conveyed. The separation of the streams effected at the level of the compressor enables each stream to be pre-encoded as a function of how critical the data conveyed happens to be.

To this end, the pre-encoder module 13 is fed with compressed frames TC by the compression device 5 and feeds with compressed and pre-encoded frames the modulator 3 to which the compressor-decompressor 2 is coupled. The modulator 3 then has only to effect conventional overall encoding of the compressed and pre-encoded frames.

At the receiver, the demodulator 4 concerned conventionally applies global error correction to the received compressed frame TC, which it has previously demodulated, after which the pre-encoder module 13 applies to the compressed and demodulated frame decoding specific to each type of stream.

In this way the overall error rate is matched to each type of stream for given transmission conditions, i.e. for a given signal to noise ratio $E_b/N_0$ and a given intermodulation ratio. This significantly improves the spectral efficiency of the processing system MT by reducing the redundancy applied to the overall stream, the most critical streams being given their own protection.

The compression module 5, and in particular its analysis module 7 and compression module 8, the decompression device 6, and in particular its detection module 9 and restoration module 11 and its first and second processing modules 10, 12, and the pre-encoder module 13 may take the form of electronic circuits, software (or data processing) modules, or a combination of circuits and software.

The invention combines the advantages of synchronous processing and asynchronous processing. It also provides an end-to-end delay that is deterministic and invariant for the channels that the operator considers to be critical, and in particular for the transmission of speech. The invention further provides a short end-to-end delay that may be parametered to effect a compromise with the compression overhead.

The invention further offers smoothing of asynchronous streams because they are transmitted using residual bandwidth (the second sections of the compressed frames).

Thanks to the invention, each type of traffic may be taken into account.

Finally, the invention is compatible with a method of distributing the resources (or transmission channels) of the satellite between the various satellite links, which is known as demand assignment multiple access (DAMA), by way of an overall bit rate that varies slowly (unlike bursty traffic).

In this latter regard, the invention exploits the dynamic characteristics of the signals transmitted: 80% of traffic is typically speech traffic. Speech traffic evolves slowly, when a new call is set up or a call is completed, or when speech gives way to silence on a given channel, and vice-versa. These events occur at a low rate compared to applications typical of multimedia transmission systems, in which the data streams come in bursts, in particular each time that a user solicits a file transfer or accesses a new web page. Moreover, for a large number of simultaneous calls, as at peak times, there is encountered a phenomenon of overall smoothing of all speech traffic around the median traffic value situated from 35% to 50% of the channels set up in accordance with the average pro rata of speech time to call duration. At the busiest time, and thus at the time that is the most constraining for the transmission device, the relative load variations are reduced thanks to this smoothing phenomenon, which is therefore beneficial to the operation of compression means associated with a transmission system operating in the DAMA mode: the system may respond relatively slowly, the traffic evolving slowly.

The invention is not limited to the compression device, decompression device, compressor/decompressor and communication network described hereinabove by way of example only, but encompasses all variants thereof that the person skilled in the art might envisage that fall within the scope of the following claims.

Thus the invention relates equally to communication networks other than cellular networks. The mixed synchronous/asynchronous transmission principle with auto-adaptation of the transmission resources used for each stream optimizes the backup of speech, data and/or signaling traffic to networks other than cellular networks, as a function of the relative criticality of the streams conveyed, and in particular guaranteeing a short and deterministic delay for the most critical streams.

There is claimed:

1. A compression device for compressing data contained in input frames to be compressed constituted of stream frames defining portions of transmission rate adaptation unit (TRAU) and signaling frames that have to be transmitted within a communication network and each of which comprising at least a header containing control data representative at least of one of a type of the stream frame and payload data, certain types containing at least one of critical and non-critical data, the compression device comprising:
   analysis module which analyzes each TRAU or signaling frame header contained in successively received input frames and determines the type of a respective input frame; and
   compression module which generates periodically compressed frames, wherein each frame is divided into a first section of a first size, which corresponds to a critical data size, and a second section of a second size, different from the first size,
   said critical data is compressed synchronously into the first section,
   said non-critical data is compressed asynchronously into the second section after the critical data of the critical data size is compressed into the first section, and
   the compressed frame having the first section and second section is transmitted within the communication network.

2. The compression device claimed in claim 1 wherein said frame types are selected from the group comprising speech frames containing at least control data and critical payload data, silence frames containing at least critical control data, SID frames containing at least critical control data and non-critical payload data, and bad frames containing at least critical control data.

3. The compression device claimed in claim 1, wherein said compression module generates a compressed frame every N input frames received during a compression cycle.

4. The compression device claimed in claim 1, wherein the first size of said first section and the second size of the second section of the compressed frame are variable and complementary.

5. The compression device claimed in claim 2, wherein said compression module integrates said speech frames into said first sections of said compressed frames without modifying the speech frames.

6. The compression device claimed in claim 2, wherein said speech frames further comprise synchronization data, and said compression module integrates said speech frames into said first sections of said compressed frames after suppression of said synchronization data but without modification of said control data and said payload data.

7. The compression device claimed in claim 2, wherein said control data is contained in said header and in an end portion of said stream frames, and said compression module, once in possession of all of said control data of at least one of an SID frame, a silence frame, or a bad frame, eliminates from the control data redundant or non-significant information and generates a relevant information word, including relevant information, of a substantially smaller size than a size of the control data.

8. The compression device claimed in claim 7, wherein the compression module:
   integrates said speech frames into said first sections of said compressed frames without modifying the speech frames, and
   constitutes compressed frames comprising the first section containing:
      at least one of said relevant information word or the data conveyed by said speech frames, and
      a header identifying a start of said compressed frame and information designating each channel of the received input frame to which belongs the data from which said relevant information of the relevant information word or the data of said speech frame is obtained.

9. The compression device claimed in claim 2, wherein said compression module:
   extracts said non-critical payload data from said SID frames and signaling data from the signaling frames,
   stores the extracted data temporarily in a buffer as a function of an order of arrival, thereby constituting a string,
   extracts from a head of said string a portion whose size is selected as a function of a current variable size of said second section to integrate said portion into said second section of the frame currently being compressed, accompanied by a header identifying a start of said extracted portion and information designating each channel of the received input frame to which the extracted non-critical payload data or the extracted signaling data of said extracted string portion belongs, and
   concatenates said second section with said first section to define a compressed frame to be transmitted.

10. The compression device claimed in claim 1, wherein said compression module adapts respective sizes of said first and second sections as a function of a load of said network in terms of the speech frames.

11. A decompression device for decompressing data contained in frames compressed with the compression device of claim 1, said decompression device comprising:
   detection module which analyzes successively received compressed frames to separate the first and second received sections,
   first processing module which reconstitutes synchronously the critical data of the input frames, synchronously compressed, from said first received sections,
   second processing module which reconstitutes asynchronously the non-critical data of the input frames, asynchronously compressed, from said second received sections, and
   restoration module which restores original input frames from the reconstituted critical and non-critical data.

12. The decompression device claimed in claim 11, wherein said first processing module and said second processing module operate in parallel.

13. A compressor/decompressor for a communication network, comprising the compression device of claim 1 and a decompression device which comprises:

detection module which analyzes successively received compressed frames to separate the first and second sections, first processing module which reconstitutes synchronously the critical data of the input frames, synchronously compressed, from the first received sections, second processing module which reconstitutes asynchronously the non-critical data of the input frames, asynchronously compressed, from the second received sections, and restoration module which restores original input frames from the reconstituted critical and non-critical data.

14. The compressor/decompressor claimed in claim 13, further comprising a pre-encoder module which is coupled to said compression and decompression devices and applies at least one of:

pre-encoding to the data, contained in each compressed frame, as a function of a respective type of a stream, to which said data belongs, or decoding to the data contained in each compressed and demodulated frame, which decoding is specific to the respective type of a stream to which the data belongs.

15. A compression device for compressing data of input frames, each comprising at least a header including control data indicative of a frame type, the compression device comprising:

analysis module which analyzes each frame header to determine a type of the frame, identifies data in the frame as being at least one of critical data or non-critical data, and determines a type of compression to be applied to the data of the input frames based on the frame type and data type; and compression module which splits a size of each frame into a first section of a first size, which corresponds to a critical data size and a second section of a second size, different from the first size, based on a size of the critical data to be compressed, compresses the critical data into the first section synchronously and the non-critical data into the second section asynchronously after the critical data of the critical data size is compressed into the first section, and transmits the compressed frame having the first section and second section within the communication network.

16. The compression device claimed in claim 1, wherein a single frame comprises the first section and the second section, the first section is compressed with synchronous deterministic processing and the second section is compressed with asynchronous, non-deterministic processing, and the compressed TRAU or signaling frame is transmitted to another link in the communication network.

17. The compression device claimed in claim 1, wherein the first size of the first section and the second size of the second section of a first frame differ from respective first size of the first section and the second size of the second section of a second frame.

18. The compression device claimed in claim 1, wherein the analysis module determines the type of the respective input frame based on a channel from which the respective input frame arrived.

* * * * *